US009892336B2

United States Patent
Chen et al.

(10) Patent No.: US 9,892,336 B2
(45) Date of Patent: Feb. 13, 2018

(54) DETECTION DEVICES AND METHODS FOR DETECTING REGIONS OF INTEREST

(71) Applicant: MediaTek Inc., Hsin-Chu (TW)

(72) Inventors: Yu-Ting Chen, Taipei (TW); Tung-Chien Chen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 50 days.

(21) Appl. No.: 14/907,032

(22) PCT Filed: May 15, 2015

(86) PCT No.: PCT/CN2015/079023
§ 371 (c)(1),
(2) Date: Jan. 22, 2016

(87) PCT Pub. No.: WO2015/172735
PCT Pub. Date: Nov. 19, 2015

(65) Prior Publication Data
US 2016/0162746 A1     Jun. 9, 2016

Related U.S. Application Data

(60) Provisional application No. 61/994,240, filed on May 16, 2014.

(51) Int. Cl.
*G06K 9/00* (2006.01)
*G06K 9/32* (2006.01)
(Continued)

(52) U.S. Cl.
CPC .......... *G06K 9/3233* (2013.01); *G06T 7/0016* (2013.01); *G06T 7/11* (2017.01);
(Continued)

(58) Field of Classification Search
CPC .................................. G06K 9/00; G06T 7/00
(Continued)

(56) References Cited

U.S. PATENT DOCUMENTS

| 9,659,229 B2 * | 5/2017 | Clifton | ................. A61B 5/0205 |
| 2005/0059870 A1 * | 3/2005 | Aceti | ................... A61B 5/0002 600/340 |
| 2010/0183199 A1 * | 7/2010 | Smith | ................... G06F 19/322 382/117 |

FOREIGN PATENT DOCUMENTS

| CN | 101051385 A | 10/2007 |
| CN | 102163277 A | 8/2011 |
| CN | 101833646 B | 5/2012 |

OTHER PUBLICATIONS

International Search Report and Written Opinion for PCT/CN2015/079023 (dated Jul. 21, 2015).

\* cited by examiner

*Primary Examiner* — Abolfazl Tabatabai
(74) *Attorney, Agent, or Firm* — McClure, Qualey & Rodack, LLP

(57) ABSTRACT

A detection method and a detection device for detection of at least one region of interest (ROI) using the same are provided. A plurality of successive frames is captured by an image sensor. A first frame among the plurality of successive frames is divided into a plurality of sub regions. A first vital-sign feature of a first sub region among the plurality of sub regions is obtained. A first feature signal is generated according to the first vital-sign feature. Whether the first feature signal is a first valid image signal is determined. When it is determined that the first feature signal is a first valid image signal, the first sub region is identified as a first ROI. In the frames occurring after the first frame, the first ROI is tracked.

20 Claims, 7 Drawing Sheets

(51) Int. Cl.
  *G06T 7/00* (2017.01)
  *G06T 7/11* (2017.01)
  *H04N 5/225* (2006.01)
(52) U.S. Cl.
  CPC .............. *G06T 2207/10016* (2013.01); *G06T 2207/20021* (2013.01); *G06T 2207/30004* (2013.01); *G06T 2207/30196* (2013.01)
(58) Field of Classification Search
  USPC ........ 382/103, 107, 236; 348/149, 154, 155, 348/169, 170, 171, 172, 235, 352
  See application file for complete search history.

DETECTION DEVICES AND METHODS FOR DETECTING REGIONS OF INTEREST

CROSS REFERENCE TO RELATED APPLICATIONS

This application claims the benefit of U.S. Provisional Application No. 61/994,240, filed on May 16, 2014, the contents of which are incorporated herein by reference.

BACKGROUND OF THE INVENTION

Field of the Invention

The invention relates to a detection device, and, more particularly, to a detection device for detecting a region of interest according to vital sign signals.

Description of the Related Art

Recently, video cameras are provided to determine vital signs of human subjects through non-contact methods. There are several advantages of extracting vital signs by video camera; it is convenient, comfortable, and safe to the human subjects, because of the wireless and non-contact operation of the video cameras. Moreover, compared with major medical equipment, the cost of a video camera is low. For long-term monitoring in home care, the lower cost is beneficial to the user.

When a video camera is used for extracting vital sign signals, a region of interest (ROI) should be identified in advance, such as a region of the skin of the human subject that will allow for heart-action detection or blood-oxygen detection, or the chest region can be used for detection of the respiration rate. However, if the human subject is not facing the video camera, the conditions surrounding the human subject can be too light or too dark, or the subject's face may not be recognized, and thus the video camera is not capable identifying an appropriate ROI. In such cases, vital signs cannot be measured accurately, or the measurement of vital signs will fail.

BRIEF SUMMARY OF THE INVENTION

Thus, it is desirable to provide a detection device which can detect a region of interest according to signals related to vital signs of subjects.

An exemplary embodiment of a detection device is provided. The detection device detects at least one region of interest (ROI) in a first frame captured by an image sensor. The detection device comprises an image processing module, a calculation module, and an identification module. The image processing module is configured to divide the first frame into a plurality of sub regions. The calculation module is configured to obtain a first vital-sign feature of a first sub region among the plurality of sub regions to generate a first feature signal. The identification module is configured to receive the first feature signal and determine whether the first feature signal is a first valid image signal. When the identification module determines the first feature signal is the first valid image signal, the identification module identifies the first sub region as a first ROI.

An exemplary embodiment of a detection method is provided. The detection method is performed to detect at least one region of interest (ROI). The detection method comprises steps of capturing a plurality of successive frames; dividing a first frame among the plurality of successive frame into a plurality of sub regions; obtaining a first vital-sign feature of a first sub region among the plurality of sub regions; generating a first feature signal according to the first vital-sign feature; determining whether the first feature signal is a first valid image signal; when it is determined that the first feature signal is the first valid image signal, identifying the first sub region as a first ROI; and tracking the first ROI in the frames occurring after the first frame.

Another exemplary embodiment of an image tracking apparatus. The tracking apparatus comprises an image sensor, a detection device, and a tracking module. The image sensor is configured to capture a plurality of successive frames. The detection device is configured to perform a detection operation on the successive frames by dividing one frame into a plurality of sub regions, obtain at least one vital-sign feature of at least one sub region among the plurality of sub regions to generate at least one feature signal, and determine whether the least one feature signal is valid, wherein when the detection device determines that the at least one feature signal is valid, the detection device identifies the at least one sub region as a region of interest (ROI). The tracking module is configured to track the ROI in the frames occurring after the one frame.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
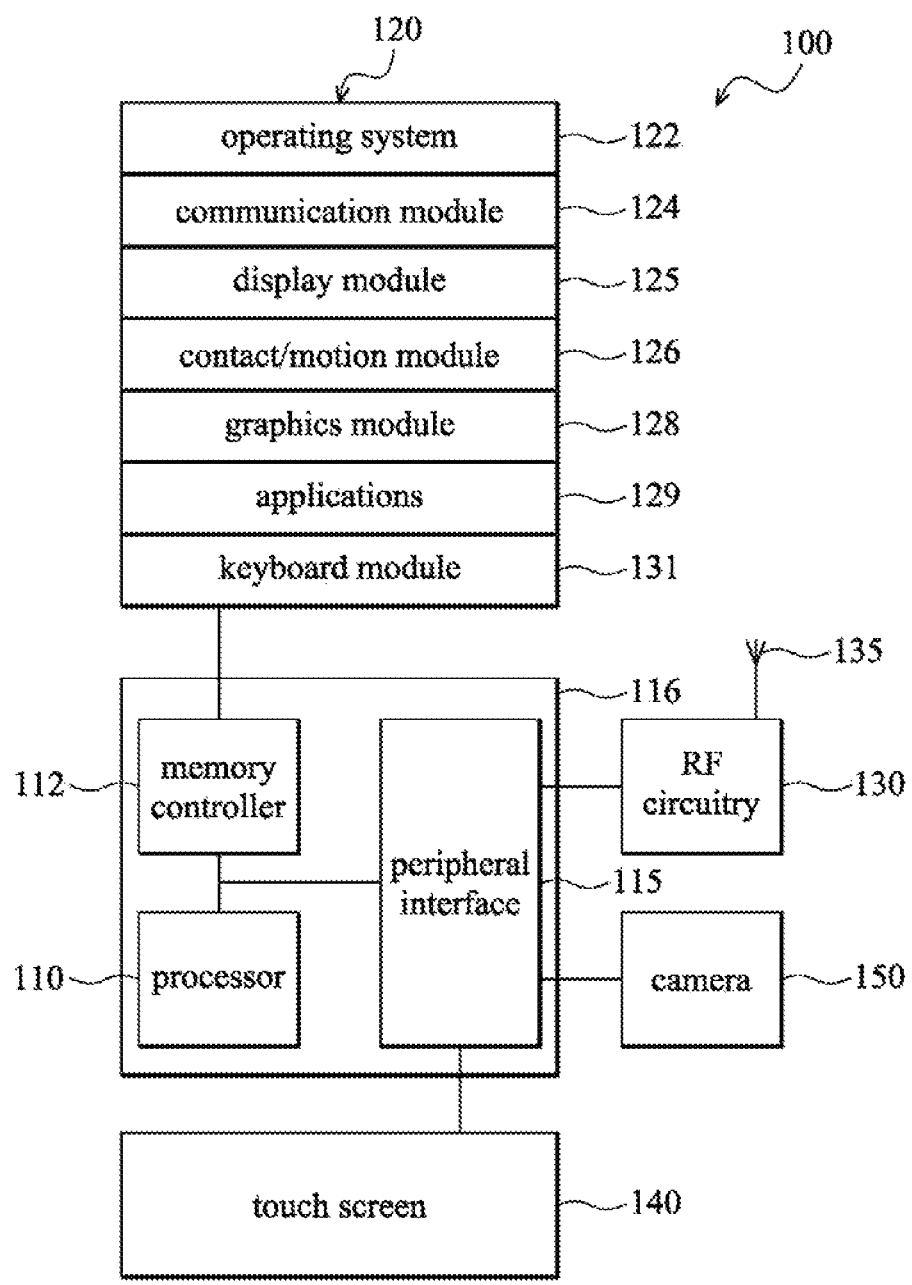
FIG. 1 is a schematic diagram illustrating a portable electronic device according to an exemplary embodiment of the invention.

FIG. 1 is a schematic diagram illustrating a portable electronic device 100 according to an exemplary embodiment of the invention. The portable electronic device 100 may comprise a processor 110, a memory unit 120, a RF circuitry 130, a touch screen 140, and a camera 150. In an exemplary embodiment, the portable electronic device 100 may be a cellular telephone, a smartphone or a tablet PC. The processor 110 may be one or more data processors, image processors, digital signal processors, graphic processor, and/or central processors, which are capable of executing one or more types of computer readable medium stored in the memory unit 120. The processor 110 is coupled to the RF circuitry 130, the touch screen 140, and the camera 150 through a peripheral interface 115, as illustrated in FIG. 1.

The RF circuitry 130 may be coupled to one or more antennas 135 and may allow communication with one or more additional devices, computers and/or servers using a wireless network. The portable electronic device 100 may support various communications protocols, such as code division multiple access (CDMA), Global System for Mobile Communications (GSM), Enhanced Data GSM Environment (EDGE), High-Speed Downlink Packet Access (HSDPA), Wi-Fi (such as IEEE 802.11a/b/g/n), Bluetooth, Wi-MAX, a protocol for email, instant messaging (IM), and/or a short message service (SMS), but the invention is not limited thereto.

The camera 150 may capture a plurality of frames from scenes and transmit signals related to the captured frames to the processor 110 through the peripheral interface 115. The peripheral interface 115 is coupled to the camera 150 by a wired or wireless connection manner. In the embodiment of FIG. 1, the camera 150 is equipped in the portable electronic device 100. However, in another embodiment, the camera 150 is implemented independently or implemented in another device and coupled to the portable electronic device 100 by a wired or wireless manner.

The touch screen 140 may detect contact and any movement or break thereof using any of a plurality of touch sensitivity technologies now known or to be later developed, including, but not limited to, capacitive, resistive, infrared, and surface acoustic wave technologies, as well as other proximity sensor arrays or other elements for determining one or more points of contact with the touch screen 140. However, the touch screen 140 may also display visual output from the portable electronic device 100. In some embodiments, the portable electronic device 100 may include circuitry (not shown in FIG. 1) for supporting a location determining capability, such as that provided by the Global Positioning System (GPS). In some embodiments, the touch screen 140 can be replaced by a display screen when the touch-sensitive function is not needed.

The memory controller 112 may be coupled to the memory unit 120, which may include one or more types of computer readable medium. The memory unit 120 may include high-speed random access memory (e.g. SRAM or DRAM) and/or non-volatile memory, such as one or more magnetic disk storage devices, one or more optical storage devices, and/or flash memory. The memory unit 120 may store an operating system 122, such as LINUX, UNIX, OS X, WINDOWS, Android, or an embedded operating system such as VxWorks. The operating system 122 may include procedures for handling basic system services and for performing hardware dependent tasks. The memory unit 120 may also store communication procedures in a communication module 124. The communication procedures may be used for communicating with one or more additional devices, one or more computers and/or one or more servers. The memory unit 120 may include a display module 125, a contact/motion module 126 to determine one or more points of contact and/or their movement, and a graphics module 128. The graphics module 128 may support widgets, that is, modules or applications with embedded graphics. The widgets may be implemented using JavaScript, HTML, Adobe Flash, or other suitable computer program languages and technologies.

The memory unit 120 may also include one or more applications 129. For example, applications stored in the memory unit 120 may include telephone applications, email applications, text messaging or instant messaging applications, memo pad applications, address books or contact lists, calendars, picture taking and management applications, and music playing and management applications. The applications 129 may include a web browser (not shown in FIG. 1) for rendering pages written in the Hypertext Markup Language (HTML), Wireless Markup Language (WML), or other languages suitable for composing web pages or other online content. The memory unit 120 may further include a keyboard module (or a set of instructions) 131. The keyboard module 131 operates one or more soft keyboards.

It should be noted that each of the above identified modules and applications correspond to a set of instructions for performing one or more functions described above. These modules (i.e., sets of instructions) need not be implemented as separate software programs, procedures or modules. The various modules and sub-modules may be rearranged and/or combined. Various functions of the portable electronic device 100 may be implemented in hardware and/or in software, including in one or more signal processing and/or application specific integrated circuits.

Figure 2:
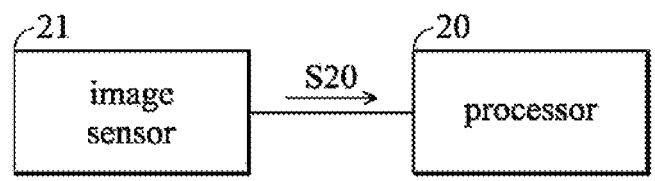
FIG. 2 shows one exemplary embodiment of an electronic system.
Figure 3:
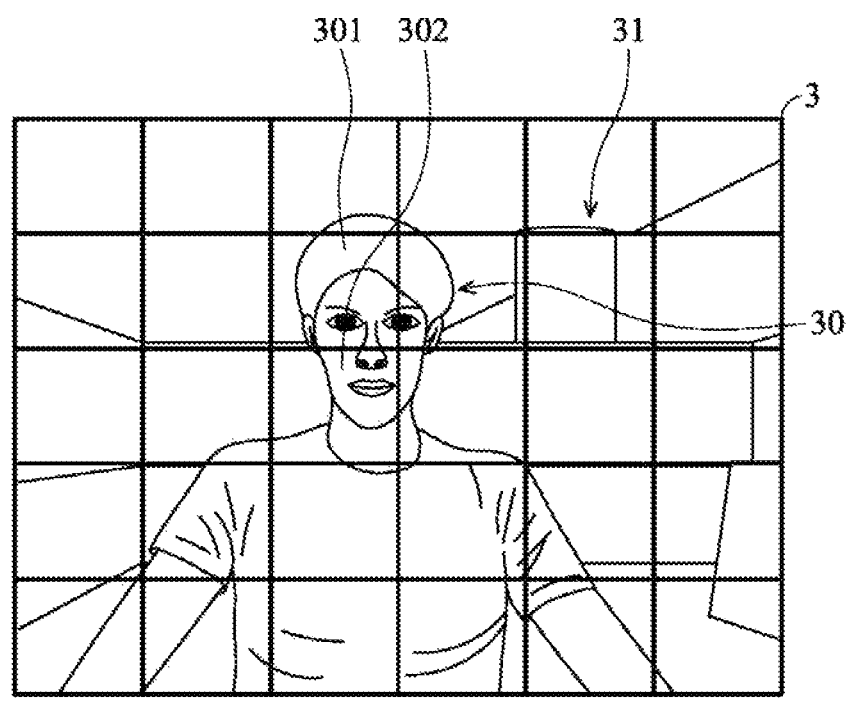
FIG. 3 is a schematic diagram illustrating division of a reference frame by quadrangles.
Figure 4:
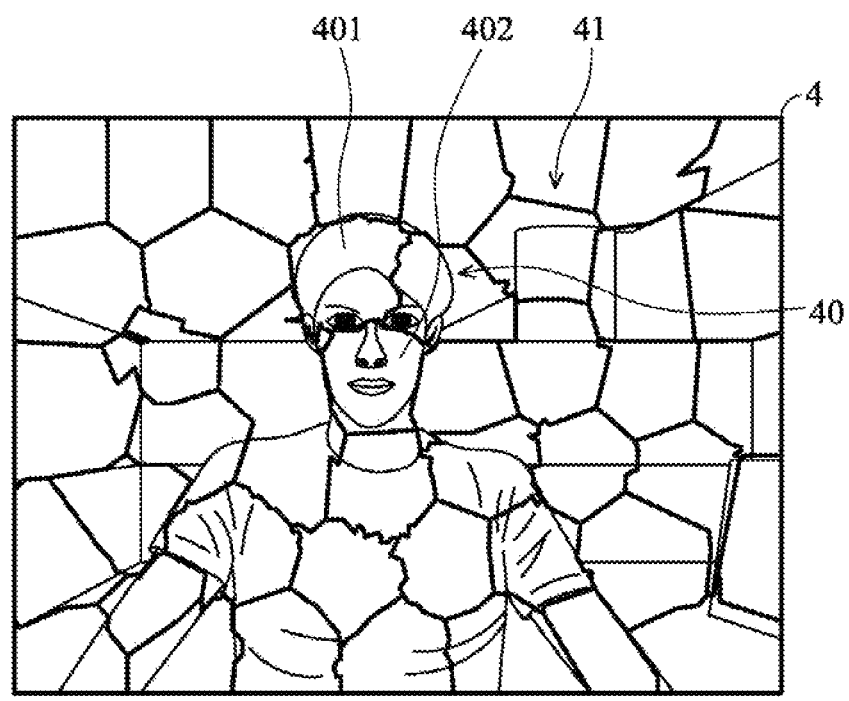
FIG. 4 is a schematic diagram illustrating division of a reference frame by super-pixels.

FIG. 2 shows an exemplary embodiment of an electronic system. As shown in FIG. 2, an electronic system 2 comprises a processor 20 and an image sensor 21. The processor 20 operates to detect a region of interest (ROI) on a subject. The image sensor 21 operates to capture a plurality of successive frames from scenes in a plurality of frame periods. The processor 20 is coupled to the image sensor 21 to receive sensing signals S20 related to the captured frames. The processor 20 selects one frame among the captured frames to serve as a reference frame. In an embodiment, the reference frame may be the frame which is captured in the first frame period occurring after the processor 20 starts operating to detect an ROI. The processor 20 divides the reference frame into a plurality of sub regions. Accordingly, the sensing signals S20 related to the reference frame respectively belong to the sub regions of the reference frame, and the sensing signal S20 of each sub region comprises color information of the pixels covered by the sub region. The color information may be RGB, YUV, YCrCb, grayscale, infrared data, or sensor raw. In an embodiment, the processor 20 divides the reference frame by pixel configuration of the image sensor, a plurality of quadrangles, a plurality of polygons, or a plurality of circles. For example, as shown in FIG. 3, the reference frame 3 shows a scene including a subject (such as a human being) 30 and a background 31, and the frame 3 is divided into sub regions, such as sub regions 301 and 302, by quadrangles. In another embodiment, the processor 20 divides the reference frame by super-pixels. As shown in FIG. 4, there are some edges between a subject (such as a human being) 40 and a background 41. Moreover, the background 41 includes some portions with relatively high brightness and some portions with relatively low brightness, which causes a color difference between the portions of varying brightness. Thus, the processor 20 divides the reference frame into sub regions (such as sub regions 401 and 402) by super-pixels which are determined according to the edge appearance and color difference shown in the reference frame 4. Each sub region corresponds to one object. For example, as shown in 4, the object corresponding to the sub region 402 includes the mouth, nose, chin and cheeks of the subject 40.

After the division of the reference frame is completed, the subject may move in the following frame periods. At this time, the shape and/or position of at least one sub region may be changed by tracking corresponding the object of the at least one sub region. For example, as shown in FIG. 4, when the subject 40 moves towards the right, the position of the sub region 402 moves with the movement of the corresponding object (including the mouth, nose, chin and cheeks). The shape and/or position of the sub regions covering the subject 40 or disposed near the subject 40 may be changed by the movement of the corresponding object.

When the sub regions of the reference frame are obtained, the processor 20 performs a specific operation on the sensing signal S20 of each sub region of the reference frame within a predetermined time-interval occurring after the reference frame is captured to obtain the feature. In the embodiment, within the predetermined time-interval, there are several frame periods. The processor 20 generates a feature signal related to the sub region according to the obtained feature. In the embodiment, the feature signal is a signal related to a vital sign of the subject (a human being 30 or 40), such as the heart rate, respiration rate, or blood-oxygen content. In the following, the specific operation will be described by using an example in which a feature signal related to the heart rate is obtained. In this case, the feature signal is referred to as a "vital sign signal". Since the color of the skin of a specific subject can change when blood flows through it, the color information can serve as a vital-sign feature to estimate the heart rate of the subject. In this case, for each sub region, the processor 20 performs the specific operation on the corresponding sensing signal to calculate an average value of at least one color component (such as R, G, and/or B component) of the pixels, involved in the corresponding sensing signal, within the predetermined time-interval. The calculated average value serves as the vital-sign feature of the sub region. According to the calculated average value, the processor 20 estimates the feature signal related to the heart rate.

In the embodiment, the processor 20 estimates the feature signals of all the sub regions of the reference frame. However, in other embodiments, the processor 20 may estimate the feature signals of some of the sub regions of the reference frame. For example, the quality of the sensing signals from the sub regions with over-exposure or under-exposure in the reference frame is usually lower due to the subtle changes of vital signs may be lost, and, thus, these sub regions with over-exposure or under-exposure may be invalid for the ROI detection. Thus, the processor 20 just estimates the feature signals of the sub regions excluding the sub region with over-exposure or under-exposure.

Then, for each estimated feature signal, the processor 20 determines whether the feature signal is a valid image signal. In an embodiment, the processor 20 assesses the quality of the feature signal and determines whether the feature signal is a valid image signal according to the assessed quality. In one case, the processor 20 may determine whether the image difference in one sub region between two adjacent frame periods occurring within the predetermined time-interval is larger than a predetermined threshold (referred to as "pixel domain manner" for quality assessment). When the image difference is not larger than the predetermined threshold, which means that the subject may not move or may move by slight shifting in the two adjacent frame periods shifting, the processor 20 determines that the quality of the feature signal is high and determines the feature signal is a valid image signal; when the image difference is larger than the predetermined threshold, which means that the subject may move by greater shift in the two adjacent frame periods shifting, the processor 20 determines that the quality of the feature signal is low and determines that the feature signal is not a valid image signal. In another case, the processor 20 may determine whether there is a relative high peak occurring in the feature signal of one sub region within the predetermined time-interval (referred to as "signal domain manner" for quality assessment). When there is no relative high peak, which means that the subject may have stable feature signal or may not move or move by slight shifting in these several successive frame periods, the processor 20 determines that the quality of the feature signal is high and determines the feature signal is a valid image signal; when there is a relative high peak, which means that the subject may have unstable feature signal or may move by greater shifting in these several successive frame periods, the processor 20 determines that the quality of the feature signal is low and determines that the feature signal is not a valid image signal. In further another case, the processor 20 may convert the feature signal from time domain to frequency domain via some techniques, such as fast Fourier transform (FFT). The processor 20 determines whether the spectrum energy is concentrated within a small nearby frequency range of one spectrum frequency (referred to as "frequency domain manner" for quality assessment). When the concentration of the spectrum energy is larger than the predetermined threshold, the processor 20 determines that the quality of the feature signal is high and determines the feature signal is a valid image signal; when the concentration of the spectrum energy is not larger than the predetermined threshold, the processor 20 determines that the quality of the feature signal is low and determines that the feature signal is not a valid image signal. The processor 20 assesses the quality of each feature signal by at least one of the pixel domain, signal domain, and frequency domain manners. In the embodiment, for one sub region, at least one of the manners defined above is performed after the obtainment of the feature signal is completed. In another embodiment, for one sub region, at least one of the manners defined above is performed in several frame periods within the predetermined time-interval, wherein the total length of the several frame periods is shorter than the predetermined time-interval. That is, the quality of the feature can be pre-assessed before the estimation of the feature signal is completed.

In another embodiment, for each estimated feature signal, the processor 20 compares the feature signal with a predetermined reference signal which is obtained in advance or has previously been stored in a memory and determines whether the feature signal is a valid image signal according to the comparison result (feature comparison). When the difference between the feature signal and the predetermined reference signal is within a reference range, the processor 20 determines that the feature signal is a valid image signal; when the difference between the feature signal and the predetermined reference signal is outside the reference range, the processor 20 determines that the first feature signal is not a valid image signal.

In further another embodiment, for each estimated feature signal, the processor 20 determines whether the feature signal is a valid image signal by performing object detection (such as skin detection, face detection, or chest detection) to the sub regions or using the position information of the subject. In some embodiments, the processor 20 may perform at least two of the quality assessment, the feature comparison, and object detection to determine whether the feature signal is a valid image signal.

When only one feature signal is determined as a valid image signal, the processor 20 directly identifies the corresponding sub region as an ROI. In a case that several feature signals are determined as valid image signals, the processor 20 merges the corresponding sub regions which are adjacent to each other to form a merged region and identifies the merged region as an ROI. If there is still a sub region separated from the merged region, the processor 20 identifies the sub region as another ROI. When the ROI(s) is identified, the ROI can be shown in a display disposed in the electronic system 2 or connected to the electronic system 2, such as a liquid crystal display or a touch panel.

In the embodiment of FIG. 2, both the processor 20 and image sensor 21 are implemented in one single electronic device, such as the portable electronic device 100 shown in FIG. 1. The processor 20 is implemented by the processor 110 of FIG. 1, and the image sensor 21 is a camera, such as the camera 150 shown in FIG. 1. In another embodiment, the processor 20 and image sensor 21 are implemented in different electronic devices. For example, the processor 20 is implemented in a vital sign measurement device, while the image sensor 21 is implemented in a camera. The processor 20 is coupled to the image sensor 21 in a wired or wireless connection manner.

Figure 5:
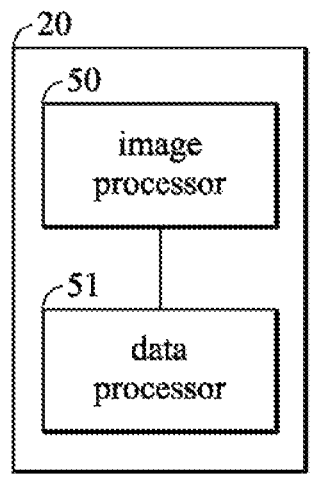
FIG. 5 shows another exemplary embodiment of an electronic system.

In the embodiment of FIG. 2, the processor 20 may be implemented by one image processor and one data processor. As shown in FIG. 5, an image processor 50 performs the operations related to the frame division as described above, while a data processor 51 performs the operations related to the obtainment of the sensing signals, the estimation of the feature signals from the sensing signals, the determination of whether each feature signal is a valid image signal, and the identification of ROIs.

According to the above embodiment, when at least one ROI is identified, the ROI may serve as a region for vital sign measurement, such as heart rate, respiration, blood-oxygen content of the subject, facial recognition, or camera auto-focus.

Figure 6:
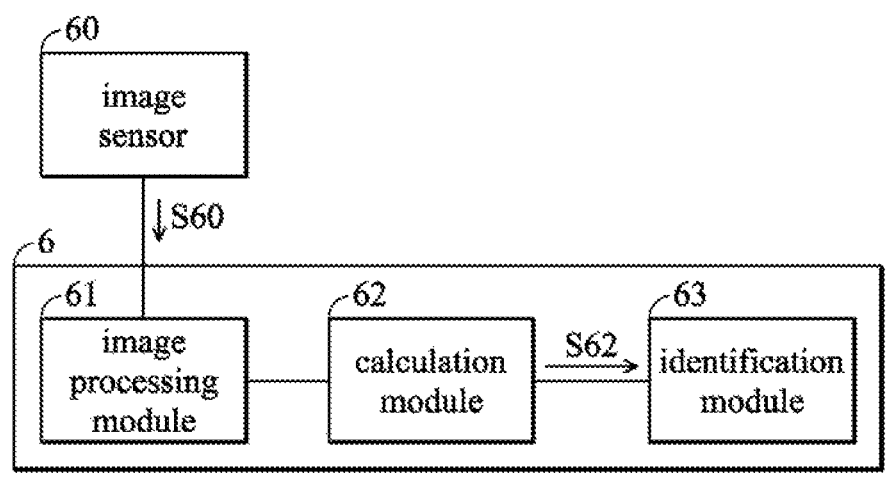
FIGS. 6 and 7 show an exemplary embodiment of a detection device.

FIG. 6 shows an exemplary embodiment of a detection device. As shown in FIG. 6, a detection device 6 comprises an image processing module 61, a calculation module 62, and an identification module 63 and operates to detect a region of interest (ROI) on a subject. There is an image sensor 60 coupled to the detection device 6 by a wired or wireless connection manner. The image sensor 60 operates to capture a plurality of successive frames from scenes in a plurality of frame periods. In the embodiment, the image sensor 60 is a camera, such as the camera 150 shown in FIG. 1. The image processing module 61 is coupled the image sensor 60 to receive sensing signals S60 related to the captured frames. The image processing module 61 selects one frame among the captured frames to serve as a reference frame. In an embodiment, the reference frame may be the frame which is captured in the first frame period occurring after the processor 20 starts operating to detect an ROI. The image processing module 61 divides the reference frame into a plurality of sub regions. Accordingly, the sensing signals S60 related to the reference frame respectively belong to the sub regions of the reference frame, and the sensing signal S60 of each sub region comprises color information of the pixels covered by the sub region. The color information may be RGB, YUV, YCrCb, grayscale, infrared data, or sensor raw. In an embodiment, the image processing module 61 divides the reference frame by pixel configuration of the image sensor, a plurality of quadrangles, a plurality of polygons, or a plurality of circles. For example, as shown in FIG. 3, the reference frame 3 shows a scene including a subject (such as a human being) 30 and a background 31, and the frame 3 is divided into sub regions, such as sub regions 301 and 302, by quadrangles. In another embodiment, the image processing module 61 divides the reference frame by super-pixels. As shown in FIG. 4, there are some edges between a subject (such as a human being) 40 and a background 41. Moreover, the background 41 includes some portions with relatively high brightness and some portions with relatively low brightness, which causes a color difference between the portions of varying brightness. Thus, the image processing module 61 divides the reference frame into sub regions (such as sub regions 401 and 402) by super-pixels which are determined according to the edge appearance and color difference shown in the reference frame 4. Each sub region corresponds to one object. For example, as shown in 4, the object corresponding to the sub region 402 includes the mouth, nose, chin and cheeks of the subject 40.

After the division of the reference frame is completed, the subject may move in the following frame periods. At this time, the shape and/or position of at least one sub region is changed by tracking corresponding the object of the at least one sub region. For example, as shown in FIG. 4, when the subject 40 moves towards the right, the position of the sub region 402 moves with the movement of the corresponding object (including the mouth, nose, chin and cheeks). The shape and/or position of the sub regions covering the subject 40 or disposed near the subject 40 may be changed by the movement of the corresponding object.

When the sub regions of the reference frame are obtained, the calculation module 62 performs a specific operation on the sensing signal S60 of each sub region of the reference frame within a predetermined time-interval occurring after the reference frame is captured to obtain the feature. In the embodiment, within the predetermined time-interval, there are several frame periods. The calculation module 62 generates a feature signal related to the sub region according to the obtained feature. In the embodiment, the feature signal is a signal related to a vital sign of the subject (a human being 30 or 40), such as the heart rate, respiration rate, or blood-oxygen content. In the following, the specific operation will be described by using an example in which a feature signal related to the heart rate is obtained. In this case, the feature signal is referred to as a "vital sign signal". Since the color of the skin of a specific subject changes when blood flows through it, the color information can serve as a vital-sign feature to estimate the heart rate of the subject. In this case, for each sub region, the calculation module 62 performs the specific operation on the corresponding sensing signal to calculate an average value of at least one color component (such as R, G, and/or B component) of the pixels, involved in the corresponding sensing signal, within the predetermined time-interval. The calculated average value serves as the vital-sign feature of the sub region. According to the calculated average value, the calculation module 62 estimates the feature signal related to the heart rate.

In the embodiment, the calculation module 62 estimates the feature signals of all the sub regions of the reference frame. However, in other embodiments, the calculation module 62 may estimate the feature signals of some of the sub regions of the reference frame. For example, the quality of the sensing signals from the sub regions with over-exposure or under-exposure in the reference frame is usually lower due to the subtle changes of vital signs may be lost, and, thus, these sub regions with over-exposure or under-exposure may be invalid for the ROI detection. Thus, calculation module 62 just estimates the feature signals of the sub regions excluding the sub region with over-exposure or under-exposure.

For each estimated feature signal, the identification module 63 determines whether the feature signal is a valid image signal. In an embodiment, the identification module 63 assesses the quality of the feature signal and determines whether the feature signal is a valid image signal according to the assessed quality. In one case, the identification module 63 may determine whether the image difference in one sub region between two adjacent frame periods occurring within the predetermined time-interval is larger than a predetermined threshold (referred to as "pixel domain manner" for quality assessment). When the image difference is not larger than the predetermined threshold, which means that the subject may not move or may move by slight shifting in the two adjacent frame periods shifting in the two adjacent frame periods shifting, the identification module 63 determines that the quality of the feature signal is high and determines the feature signal is a valid image signal; when the image difference is larger than the predetermined threshold, which means that the subject may move by greater shifting, the identification module 63, determines that the quality of the feature signal is low and determines that the feature signal is not a valid image signal. In another case, the identification module 63 may determine whether there is a relative high peak occurring in the feature signal of one sub region within the predetermined time-interval (referred to as "signal domain manner" for quality assessment). When there is no related high peak, which means that the subject may have stable feature signal or may not move or move by slight shifting in these several successive frame periods, the identification module 63 determines that the quality of the feature signal is high and determines the feature signal is a valid image signal; when there is a relative high peak, which means that the subject may have unstable feature signal or may move by greater shifting in these several successive frame periods, the identification module 63 determines that the quality of the feature signal is low and determines that the feature signal is not a valid image signal. In further another case, the identification module 63 may convert the feature signal from time domain to frequency domain via some techniques, such as fast Fourier transform (FFT). The identification module 63 determines whether the spectrum energy is concentrated within a small nearby frequency range of one spectrum frequency (referred to as "frequency domain manner" for quality assessment). The frequency range is determined according to the feature obtained by the calculation module 62, such as the heart rate. When the concentration of the spectrum energy is larger than the predetermined threshold, the identification module 63 determines that the quality of the feature signal is high and determines the feature signal is a valid image signal; when the concentration of the spectrum energy is not larger than the predetermined threshold, the identification module 63 determines that the quality of the feature signal is low and determines that the feature signal is not a valid image signal. The identification module 63 assesses the quality of each feature signal by at least one of the pixel domain, signal domain, and frequency domain manners. In the embodiment, for one sub region, at least one of the manners defined above is performed after the obtainment of the feature signal is completed. In another embodiment, for one sub region, at least one of the manners defined above is performed in several frame periods within the predetermined time-interval, wherein the total length of the several frame periods is shorter than the predetermined time-interval. That is, the quality of the feature can be pre-assessed before the estimation of the feature signal is completed.

In another embodiment, for each estimated feature signal, the identification module 63 compares the feature signal with a predetermined reference signal which is obtained in advance or has previously been stored in a memory and determines whether the feature signal is a valid image signal according to the comparison result (feature comparison). When the difference between the feature signal and the predetermined reference signal is within a reference range, the identification module 63 determines that the feature signal is a valid image signal; when the difference between the feature signal and the predetermined reference signal is outside the reference range, the identification module 63 determines that the first feature signal is not a valid image signal.

In further another embodiment, for each estimated feature signal, the identification module 63 determines whether the feature signal is a valid image signal by performing object detection (such as skin detection, face detection, or chest detection) to the sub regions or using the position information of the subject. In some embodiments, the identification module 63 may perform at least two of the quality assessment, the feature comparison, and object detection to determine whether the feature signal is a valid image signal.

When only one feature signal is determined as a valid image signal, the identification module 63 directly identifies the corresponding sub region as an ROI. In cases where several feature signals are determined as valid image signals, the identification module 63 merges the corresponding sub regions which are adjacent to each other to form a merged region and identifies the merged region as an ROI. If there is still a sub region separated from the merged sub region, the identification module 63 identifies the sub region as another ROI. When the ROI(s) is identified, the ROI can be shown in a display disposed in the detection device 6 or connected to the detection device 6, such as a liquid crystal display or a touch panel.

Figure 7:
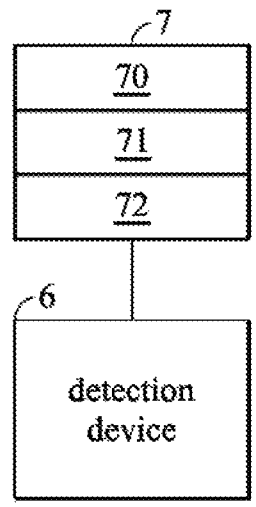

In the embodiment of FIG. 6, the detection device 6 may be implemented by a processor, such as the processor 110 shown in FIG. 1. In an embodiment, each of the modules in the detection device 6 may be implemented in a processor, such as the processor 110 shown in FIG. 1 by hardware and/or software performing one or more corresponding functions described above. In another embodiment, a memory is coupled to the detection device 6. As shown in FIG. 7, a memory 7 stores sets of instructions (or coding) 70, 71, and 72, respectively corresponding to the functions of the modules shown in FIG. 6. The detection device 6 is coupled to the memory 7 to load the sets of instructions 70, 71, and 72. When the detection device 6 performs any one set of instructions, the hardware and/or software in the detection device 6 is referred to as the corresponding module. For example, when the detection device 6 performs the set of instructions related to the quality assessment function, the hardware and/or software in the detection device 6 is referred to as the identification module 63.

According to the above embodiment, when at least one ROI is identified, the ROI may serve as a region for measurement of a vital sign, such as heart rate, respiration, blood-oxygen content of the subject, facial recognition, or camera auto-focus.

Figure 8:
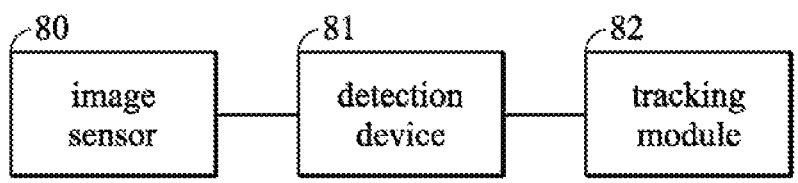
FIG. 8 shows an exemplary embodiment of a tracking apparatus.

FIG. 8 shows an exemplary embodiment of a tracking apparatus. As shown in FIG. 8, an image tracking apparatus 8 comprises an image sensor 80, a detection device 81, and a tracking module 82. The image sensor 80 operates to capture a plurality of successive frames from scenes in a plurality of frame periods. The detection device 81 performs the same detection operation as the detection device 6 of FIG. 6 to detect an ROI. After the ROI is detected, the tracking module 82 tracks the ROI in the following frames.

In an embodiment, the tracking module 82 may perform at least one tracking algorithm to track the ROI, such as an algorithm comprising at least one of existed image-based tracking techniques, such as mean shift, particle filter, or mosses. In another embodiment, the tracking module 82 enables the detection device 81 to repeatedly perform the detection operation to track the ROI. In further another embodiment, the tracking module 82 performs at least one tracking algorithm and enables the detection device 81 to repeatedly perform the detection operation to track the ROI.

The image tracking apparatus 8 may be implemented as a portable electronic device, such as the portable electronic device 100 of FIG. 1 or a camera device. In another embodiment, the image tracking apparatus 8 may be implemented as bio-signal sensor for detecting heart rate, respiration rate, or blood-oxygen content form the ROI(s). Each of the detection device 81 and the tracking module 82 may be implemented in a processor, such as the processor 110 of FIG. 1 by hardware and/or software performing one or more corresponding functions described above.

Figure 9:
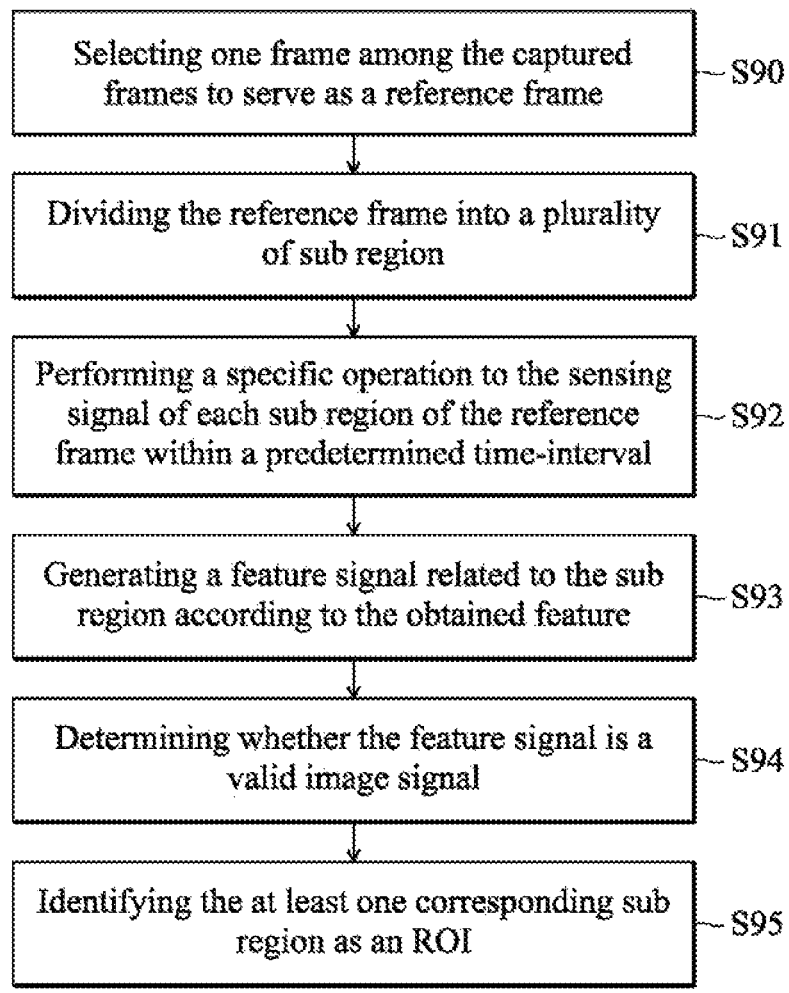
FIG. 9 shows an exemplary embodiment of a detection method.

FIG. 9 shows an exemplary embodiment of a detection method. The detection method may be performing by at least one processor, such as the processor 110 shown in FIG. 1 or the processor 20 shown in FIG. 2, or at least one module, such as the modules shown in FIG. 6. The detection method is performed to detect a region of interest (ROI) on a subject. A plurality of successive frames from scenes in a plurality of frame periods are captured by an image sensor, such as the camera 150 shown in FIG. 1. The detection method comprises a step of selecting one frame among the captured frames to serve as a reference frame (step S90). In an embodiment, the reference frame may be the frame which is captured in the first frame period occurring after the detection method starts. In another embodiment, the reference frame may be a frame which is captured in any frame period occurring after the detection method starts. The detection method further comprises a step of dividing the reference frame into a plurality of sub regions (step S91). Accordingly, the sensing signals related to the reference frame respectively belong to the sub regions of the reference frame, and the sensing signal of each sub region comprises color information of the pixels covered by the sub region. The color information may be RGB, YUV, YCrCb, grayscale, infrared data, or sensor raw. In an embodiment, the reference frame is divided by the pixel configuration of the image sensor, a plurality of quadrangles, a plurality of polygons, or a plurality of circles. For example, as shown in FIG. 3, the reference frame 3 shows a scene including a subject (such as a human being) 30 and a background 31, and the frame 3 is divided into sub regions, such as sub regions 301 and 302, by quadrangles. In another embodiment, the reference frame is divided by super-pixels. As shown in FIG. 4, there are some edges between a subject (such as a human being) 40 and a background 41. Moreover, the background 41 includes some portions with relatively high brightness and some portions with relatively low brightness, which causes a color difference between the portions of varying brightness. Thus, the reference frame is divided into sub regions (such as sub regions 401 and 402) by super-pixels which are determined according to the edge appearance and color difference shown in the reference frame 4. Each sub region corresponds to one object. For example, as shown in 4, the object corresponding to the sub region 402 includes the mouth, nose, chin and cheeks of the subject 40.

After the division step of the reference frame is completed, the subject may move in the following frame periods. At this time, the shape and/or position of at least one sub region may be changed by tracking corresponding the object of the at least one sub region. For example, as shown in FIG. 4, when the subject 40 moves towards the right, the position of the sub region 402 moves with the movement of the corresponding object (including the mouth, nose, chin and cheeks). The shape and/or position of the sub regions covering the subject 40 or disposed near the subject 40 may be changed by the movement of the corresponding object.

The detection method also comprises a step of performing a specific operation on the sensing signal of each sub region of the reference frame within a predetermined time-interval occurring after the reference frame is captured to obtain the feature (step S92) and generating a feature signal related to the sub region according to the obtained feature (step S93). In the embodiment, there are several frame periods within the predetermined time-interval. In the embodiment, the feature signal is a signal related to a vital sign of the subject (a human being 30 or 40), such as the heart rate, respiration rate, or blood-oxygen content. In the method, the specific operation will be described by using an example in which a feature signal related to the heart rate is obtained. In this case, the feature signal is referred to as a "vital sign signal". Since the color of the skin of a specific subject changes when blood flows through it, the color information can serve as a vital-sign feature to estimate the heart rate of the subject. In this case, for each sub region, the specific operation is performed on the corresponding sensing signal to calculate the average value of at least one color component (such as the R, G, and/or B component) of the pixels, involved in the corresponding sensing signal, within the predetermined time-interval. The calculated average value serves as the vital-sign feature of the sub region. According to the calculated average value, the feature signal related to the heart rate is estimated.

In the embodiment, the feature signals of all the sub regions of the reference frame are estimated. However, in other embodiments, the feature signals of some of the sub regions of the reference frame are estimated. For example, the quality of the sensing signals from the sub regions with over-exposure or under-exposure in the reference frame is usually lower due to the subtle changes of vital signs may be lost, and, thus, these sub regions with over-exposure or under-exposure may be invalid for the ROI detection. Thus, the feature signals of the sub regions excluding the sub region with over-exposure or under-exposure are estimated.

The detection method further comprises a step of, for each estimated feature signal, determining whether the feature signal is a valid image signal (step S94). In an embodiment, the quality of the feature signal is assessed, and whether the feature signal is a valid image signal is determined according to the assessed quality. In one case, whether the image difference in the feature signal of one sub region between two adjacent frame periods occurring within the predetermined time-interval is larger than a predetermined threshold is determined (referred to as "pixel domain manner" for quality assessment). When the image difference is not larger than the predetermined threshold, which means that the subject may not move or move by slight shifting in the two adjacent frame periods shifting, it is determined that the quality of the feature signal is high, and the feature signal is determined as a valid image signal; when the image difference is larger than the predetermined threshold, which means that the subject may move by greater shift between the two adjacent frame periods shifting, it is determined that the quality of the feature signal is low, and the feature signal is not determined as a valid image signal. In another case, whether there is a relative high peak occurring in the feature signal of one sub region within the predetermined time-interval is determined (referred to as "signal domain manner" for the quality assessment). When there is no relative high peak, which means that the subject may have stable feature signal or may not move or move by slight shifting in these several successive frame periods, it is determined that the quality of the feature signal is high, and the feature signal is determined as a valid image signal; when there is a relative high peak, which means that the subject may have stable feature signal or may move by greater shifting in these several successive frame periods, it is determined that the quality of the feature signal is low, and the feature signal is not determined as a valid image signal. In another case, the feature signal may be converted from time domain to frequency domain via some techniques, such as fast Fourier transform (FFT). Whether the spectrum energy is concentrated within a small nearby frequency range of one spectrum frequency is determined (referred to as "frequency domain manner" for quality assessment). When the concentration of the spectrum energy is larger than the predetermined threshold, it is determined that the quality of the feature signal is high, and the feature signal is determined as a valid image signal; when the concentration of the spectrum energy is not larger than the predetermined threshold, it is determined that the quality of the feature signal is low, and the feature signal is not determined to as a valid image signal. The quality of each feature signal may be assessed by at least one of the pixel domain, signal domain, and frequency domain manners. In the embodiment, for one sub region, at least one of the manners defined above is performed after the obtainment of the feature signal is completed. In another embodiment, for one sub region, at least one of the manners defined above is performed in several frame periods within the predetermined time-interval, wherein the total length of the several frame periods is shorter than the predetermined time-interval. That is, the quality of the feature can be pre-assessed before the estimation of the feature signal is completed.

In another embodiment, for each estimated feature signal, the feature signal is compared with a predetermined reference signal which is obtained in advance or has previously been stored in a memory and determines whether the feature signal is a valid image signal according to the comparison result (feature comparison). When the difference between the feature signal and the predetermined reference signal is within a reference range, the feature signal is determined as a valid image signal; when the difference between the feature signal and the predetermined reference signal is outside the reference range, the first feature signal is not determined as a valid image signal.

In further another embodiment, for each estimated feature signal, whether the feature signal is a valid image signal is determined by performing object detection (such as skin detection, face detection, or chest detection) on the sub regions, or by using the position information of the subject. In some embodiments, whether the feature signal is a valid image signal may be determined by performing at least two of the quality assessment, the feature comparison, and object detection.

The detection method also comprises a step of when at least one feature signal is determined as a valid image signal, identifying the at least one corresponding sub region as an ROI (step S95). When only one feature signal is determined as a valid image signal, the corresponding sub region is directly identified as an ROI. When several feature signals are determined to be valid image signals, the corresponding sub regions which are adjacent to each other are merged to form a merged region, and the merged region is identified as an ROI. If there is still a sub region separated from the merged region, the sub region is identified as another ROI. When the ROI(s) is identified, the ROI can be shown on a display, such as a liquid crystal display or a touch panel.

The detection method further comprises a step of tracking the obtained ROI in the frames occurring after the reference. According to the above embodiment, through the ROI obtainments and ROI tracking, the detection method may be performed by an electronic device, such as the portable electronic device 100 shown in FIG. 1 for vital sign measurement, such as heart rate, respiration, blood-oxygen content of the subject, face recognition, or camera auto-focus.

In an embodiment, when the detection method is performed by an electronic device equipped with an image sensor or connecting to an image sensor, such as the portable electronic device 100 shown in FIG. 1, the detection method further comprises a step of capturing a plurality of successive frames by the image sensor, such as the camera 150 shown in FIG. 1.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A detection device for detecting at least one region of interest (ROI) in a first frame captured by an image sensor:
    an image processing module to divide the first frame into a plurality of sub regions;
    a calculation module to obtain a first vital-sign feature of a first sub region among the plurality of sub regions to generate a first feature signal; and
    an identification module to receive the first feature signal and determine whether the first feature signal is a first valid image signal,
    wherein when the identification module determines the first feature signal is the first valid image signal, the identification module identifies the first sub region as a first ROI.

2. The detection device as claimed in claim 1, wherein the image processing module divides the first frame into the plurality of sub regions by pixel configuration of the image sensor, a plurality of quadrangles, a plurality of polygons, or a plurality of circles.

3. The detection device as claimed in claim 1, wherein the image processing module divides the first frame into the plurality of sub regions according to color difference or edge appearance shown in the first frame.

4. The detection device circuit as claimed in claim 1, wherein each of the sub regions corresponds to an object, and, in a predetermined time-interval occurring after the first frame is captured, a shape or position of one sub region is changed by tracking the corresponding object.

5. The detection device as claimed in claim 1, wherein the calculation module performs a specific operation on a sensing signal of the first sub region within a predetermined time-interval occurring after the first frame is captured to obtain the first vital-sign feature, and the first feature signal is estimated according to the first vital-sign feature.

6. The detection device as claimed in claim 5, wherein the calculation module performs the specific operation on the sensing signal to extract an average value of at least one color component of the first frame to serve as the first vital-sign feature.

7. The detection device as claimed in claim 1, wherein the first vital-sign feature is related to heart rates, respiration rates, or blood-oxygen content of human beings.

8. The detection device as claimed in claim 1, wherein the identification module assesses quality of the first feature signal and determines whether the first feature signal is the first valid image signal according to an assessment result.

9. The detection device as claimed in claim 1, wherein the identification module compares the first feature signal with a predetermined reference signal and determines whether the first feature signal is the first valid image signal according to a comparison result.

10. The detection device as claimed in claim 9, wherein when a difference between the first feature signal and the predetermined reference signal is within a reference range, the identification module determines that the first feature signal is a first valid image signal, and when the difference between the first feature signal and the predetermined reference signal is outside the reference range, the identification module determines that the first feature signal is not the valid image signal.

11. The detection device circuit as claimed in claim 1, wherein the calculation module obtains a second vital-sign feature of a second sub region among the plurality of sub regions to generate a second feature signal, and the identification module receives the second feature signal and determines whether the second feature signal is a second valid image signal, and
wherein when the identification module determines the second feature signal is the second valid image signal and the second sub region is adjacent to the first sub region, the identification module merges the first sub region and the second sub region to form a merged region and identifies the merged region as the first ROI.

12. The detection device circuit as claimed in claim 1, wherein the calculation module obtains a second vital-sign feature of a second sub region among the plurality of sub regions to generate a second feature signal, and the identification module receives the second feature signal and determines whether the second feature signal is a second valid image signal,
wherein when the identification module determines the second feature signal is the second valid image signal and the second sub region is separated from the first sub region, the identification module identifies the second sub region as a second ROI.

13. A detection method for detecting at least one region of interest (ROI):
capturing a plurality of successive frames;
dividing a first frame among the plurality of successive frames into a plurality of sub regions;
obtaining a first vital-sign feature of a first sub region among the plurality of sub regions generating a first feature signal according to the first vital-sign feature;
determining whether the first feature signal is a first valid image signal;
when it is determined that the first feature signal is the first valid image signal, identifying the first sub region as a first ROI; and
tracking the first ROI in the frames occurring after the first frame.

14. The detection method as claimed in claim 13, wherein in the step of dividing the first frame into the plurality of sub regions, the first frame is divided by pixel configuration of the image sensor, a plurality of quadrangles, a plurality of polygons, or a plurality of circles.

15. The detection method as claimed in claim 13, wherein in the step of dividing the first frame into the plurality of sub regions, the first frame is divided according to color difference or edge appearance shown in the first frame.

16. The detection method circuit as claimed in claim 13, wherein each of the sub regions corresponds to an object, and, in a predetermined time-interval occurring after the first frame is captured, a shape or position of one sub region is changed by tracking the corresponding object.

17. The detection method as claimed in claim 13, wherein in the step of obtaining the first vital-sign feature of the first sub region, a specific operation is performed to a sensing signal of the first sub region within a predetermined time-interval occurring after the first frame is captured to obtain the first vital-sign feature.

18. The detection method as claimed in claim 17, wherein the specific operation is performed to the sensing signal to extract an average value of at least one color component of the first frame to serve as the first vital-sign feature.

19. The detection method as claimed in claim 13, wherein the first vital-sign feature is related to heart rates, respiration rates, or blood-oxygen content of human beings.

20. An image tracking apparatus comprising:
an image sensor to capture a plurality of successive frames;
a detection device to perform a detection operation on the successive frames by dividing one frame into a plurality of sub regions, obtain at least one vital-sign feature of at least one sub region among the plurality of sub regions to generate at least one feature signal, and determine whether the at least one feature signal is valid, wherein when the detection device determines that the at least one feature signal is valid, the detection device identifies the at least one sub region as a region of interest (ROI); and
a tracking module to track the ROI in the frames occurring after the one frame.

* * * * *